(12) United States Patent
Ye et al.

(10) Patent No.: US 11,340,419 B2
(45) Date of Patent: May 24, 2022

(54) OPTICAL LENS AND MANUFACTURING METHOD THEREOF

(71) Applicant: Ningbo Sunny Automotive Optech Co., Ltd., Yuyao (CN)

(72) Inventors: Leihong Ye, Yuyao (CN); Hujun Huang, Yuyao (CN); Yuqing Ye, Yuyao (CN)

(73) Assignee: NINGBO SUNNY AUTOMOTIVE OPTECH CO., LTD., Yuyao (CN)

( * ) Notice: Subject to any disclaimer, the term of this patent is extended or adjusted under 35 U.S.C. 154(b) by 0 days.

(21) Appl. No.: 17/035,016

(22) Filed: Sep. 28, 2020

(65) Prior Publication Data

US 2021/0165186 A1    Jun. 3, 2021

(30) Foreign Application Priority Data

Nov. 29, 2019    (CN) .......................... 201911203456.7

(51) Int. Cl.
*G02B 7/02*    (2021.01)

(52) U.S. Cl.
CPC .................................. *G02B 7/022* (2013.01)

(58) Field of Classification Search
CPC .................................. G02B 7/022; G02B 7/02
USPC .......................................................... 359/819
See application file for complete search history.

(56) References Cited

U.S. PATENT DOCUMENTS

2010/0027135 A1*    2/2010    Sodeyama ............. G02B 7/021
359/740

FOREIGN PATENT DOCUMENTS

| CN | 205861980 U | 1/2017 |
|---|---|---|
| CN | 109373848 A | 12/2018 |
| CN | 109643002 A | 4/2019 |
| CN | 208818904 U | 5/2019 |
| CN | 209356730 U | 9/2019 |
| CN | 209514180 U | 10/2019 |
| WO | WO 2018/062020 A | 4/2018 |

* cited by examiner

*Primary Examiner* — James C. Jones
(74) *Attorney, Agent, or Firm* — Birch, Stewart, Kolasch & Birch, LLP

(57) ABSTRACT

The present disclosure provides an optical lens and a manufacturing method thereof, wherein the optical lens comprises: a lens barrel and at least one lens sheet fixed in the lens barrel, wherein the lens sheet on the most object side is overlapped by the lens barrel on a side surface and an upper surface of the lens sheet, wherein the lens barrel comprises a main body and an edge fastener, and wherein the edge fastener integrally extends from the main body and overlaps the lens sheet on the most object side, so that the lens sheet is smoothly wrapped and fixed to the lens barrel. In the case where the stability of the lens sheet on the most object side is ensured, excessive stretching and bending and excessive deformation of the lens barrel is avoided at the same time, thereby improving the reliability of the overall structure.

18 Claims, 11 Drawing Sheets

OPTICAL LENS AND MANUFACTURING METHOD THEREOF

CROSS-REFERENCE TO RELATED APPLICATIONS

The present application claims the priority of Chinese patent application No. 201911203456.7, filed on Nov. 29, 2019, which is hereby incorporated by reference in its entirety.

TECHNICAL FIELD

The present disclosure relates to the field of optics, and in particular to an optical lens with a stable structure and a manufacturing method thereof.

BACKGROUND

Optical lenses are hardware devices for daily image acquisition. They are widely used in daily life and production, and act as important image sensors in various systems. For example, for an automobile control system, on-board lenses are used for image acquisition needs such as front views, rear views, surround views, inner views, and side views. At the same time, with the continuous development of autonomous driving technology, the number of on-board lenses required in automobiles has been greatly increased, and the requirements for on-board lenses have become more stringent.

However, as an on-board type of optical lenses for external use, since their working places are in the external environment, this type of optical lenses has no additional protection. Generally, there are not a few optical lenses exposed outsides. These optical lenses not only need to be designed in terms of shape or volume, but also require relatively high optical reliability, especially, in the case where the temperature and humidity are uncertain in the external environment. For the optical lenses in actual work, they will also occasionally encounter rain and snow weather or weather with high humidity. The outer surface of the existing optical lens is composed of lens sheets and a lens barrel rim. As shown in FIGS. 1A and 1B, the lens sheet 10P on the most object side is supported by a lens barrel main body 11P on a bottom side of the lens sheet 10P, and an edge 12P extending out from a top part of the lens barrel main body 11P overlaps a top side of the lens sheet 10P after the lens sheet 10P is assembled. Therefore, the lens barrel edge 12P snap-fittingly protrudes from the edge of the lens sheet 10P, so that a part of a surface of the lens sheet 10P is lower than the lens barrel edge 12P. If there are water droplets on the outside of the optical lens due to bad weather, then the water droplets on a part of the surface of the lens sheet 10P will be blocked by the lens barrel edge 12P. Even if the optical lens is placed upward, then an annular groove will be formed between the lens barrel edge 12P and the lens sheet 10P, and the water will accumulate in the groove and wait for evaporative dissipation. In some prior arts, the lens barrel edge 12P is designed as a horizontal platform or step, that is, the lens barrel edge 12P presents a circular ring cover. If the optics lens is placed vertically, then a groove will still be formed on the top side to accumulate mist, which is disadvantageous for water droplets to slide down and leave.

Obviously, the existing optical lens will be corroded in long-term stagnant water to damage the sealing performance, which will seriously affect the service life. Specifically, in the assembly process of the existing optical lens, the lens barrel edge 12P is subsequently pressed down to overlap the edge of the lens sheet 10P. As shown in FIG. 1B, a mold indenter 20P vertically presses down the lens barrel edge 12P to the lens sheet 10R In this process, not only the stretched shape of the material of the lens barrel edge 12P will be changed, but also the lens sheet 10P will be subjected to pressure concentrated on the edge. The position of the lens sheet 10P may be moved, and the surface curvature of the lens sheet 10P may undergo a slight pressure change. In addition, the lens barrel edge 12P integrally extends from the lens barrel main body 11P, and the amount of bending deformation per unit area received by the material is relatively large. After pressing, the lens barrel edge 12P may appear uneven and break. The poor quality of the lens barrel edge 12P may cause the lens sheet 10P to loosen, the sealing performance may deteriorate, and the final image quality cannot be ensured.

SUMMARY

One of the main advantages of the present disclosure is to provide an optical lens and a manufacturing method thereof, wherein in the case where the stability of the lens sheet on the most object side is ensured, excessive stretching and bending and excessive deformation of the lens barrel is avoided at the same time, thereby improving the reliability of the overall structure.

Another advantage of the present disclosure is to provide an optical lens and a manufacturing method thereof, wherein the lens sheet is smoothly wrapped and fixed to the lens barrel, which is suitable for water droplets to slide down without hindrance.

Another advantage of the present disclosure is to provide an optical lens and a manufacturing method thereof, wherein the appearance of the optical lens does not have particularly prominent edges and corners, improving the aesthetics.

Another advantage of the present disclosure is to provide an optical lens and a manufacturing method thereof, wherein the lens sheet is pre-fixed and then sealed, so that the position of the lens sheet is not easily moved, avoiding adverse shaking effects on the imaging optical path.

Another advantage of the present disclosure is to provide an optical lens and a manufacturing method thereof, wherein the deformation of the lens barrel has certain uniformity, which is advantageous for no local squeezing and/or stretching traces in the circular edge.

Another advantage of the present disclosure is to provide an optical lens and a manufacturing method thereof, wherein the lens barrel not only avoids excessive stretching in the radial direction after processing, but also maintains the uniformity of the material in the circumferential direction, so that the overall force is averaged, reducing the possibility of breakage.

Another advantage of the present disclosure is to provide an optical lens and a manufacturing method thereof, wherein the flexibility requirements for materials are simplified by means of pre-fixing, so that there is more room for choice in material selection or processing methods.

Another advantage of the present disclosure is to provide an optical lens and a manufacturing method thereof, wherein not only the lens sheet is clamped and fixed up and down, but also the relative position of the lens sheet is more stabilized by circumferential fixing, avoiding the movement of the lens sheet position due to shaking during use.

Another advantage of the present disclosure is to provide an optical lens and a manufacturing method thereof, wherein a slot between the lens barrel and the lens sheet is avoided during the processing of the lens barrel, ensuring that the lens sheet is tightly fixed and ensuring the hermetical closure of the overall optical lens.

Another advantage of the present disclosure is to provide an optical lens and a manufacturing method thereof, wherein the lens barrel is processed by pressing so as to tightly abut against the lens sheet, and the molded structure is stable and not easily deformed.

Another advantage of the present disclosure is to provide an optical lens and a manufacturing method thereof, wherein the method for manufacturing the optical lens is relatively simple, which facilitates batch processing and reduces manufacturing costs.

Other advantages and features of the present disclosure are fully embodied by the following detailed description and can be realized by the combination of means and devices specifically pointed out in the appended claims.

According to one aspect of the present disclosure, an optical lens of the present disclosure that can achieve the foregoing objectives and other objectives and advantages, comprising: a lens barrel and at least one lens sheet fixed in the lens barrel, wherein the lens sheet on the most object side is overlapped by the lens barrel on a side surface and an upper surface of the lens sheet, wherein the lens barrel comprises a main body and an edge fastener, and wherein the edge fastener integrally extends from the main body and is bent to overlap the lens sheet on the most object side, so that the lens sheet is smoothly wrapped and fixed to the lens barrel.

According to one embodiment of the present disclosure, the edge fastener is substantially bent onto the lens sheet in a manner of inclining twice.

According to one embodiment of the present disclosure, a bending tendency of the edge fastener is adaptively bordered by a curvature of the upper surface of the lens sheet.

According to one embodiment of the present disclosure, the main body comprises a supporting edge and a supporting platform, wherein the supporting edge extends upward to provide support on the side surface of the lens sheet, and wherein the supporting platform protrudes inwardly to provide support on the lower surface of the lens sheet.

According to one embodiment of the present disclosure, the edge fastener comprises a fastening portion and a sealing portion, wherein the sealing portion extends from the fastening portion and is attached to the upper surface of the lens sheet, and wherein the fastening portion and the sealing portion of the edge fastener have different degrees of inclination.

According to one embodiment of the present disclosure, the sealing portion has an inclination angle greater than that of the fastening portion with respect to a vertical direction.

According to one embodiment of the present disclosure, an outer surface of the edge fastener is connected to the upper surface of the lens sheet to form a roughly arched shape.

According to one embodiment of the present disclosure, inner surfaces of the fastening portion and the sealing portion are both tightly abutted onto the lens sheet, so that there is no gap between the edge fastener and the lens sheet.

According to one embodiment of the present disclosure, an edge of the upper surface of the lens sheet is overlapped by the edge fastener, wherein the side surface of the lens sheet is surrounded by the supporting edge, and wherein the lower surface of the lens sheet is supported by the supporting platform.

According to one embodiment of the present disclosure, the upper surface and the side surface of the lens sheet are both overlapped by the edge fastener, wherein the side surface of the lens sheet is partially surrounded by the supporting edge, and wherein the lower surface of the lens sheet is supported by the supporting platform.

According to one embodiment of the present disclosure, the fastening portion comprises a bending portion and an extension portion, wherein the bending portion extends from the supporting edge to rest against the lens sheet in a bending manner, wherein the extension portion extends from the bending portion to attach onto the lens sheet in an obliquely straight manner, wherein the sealing portion comprises a buffer portion and an inclining portion, with an end portion of the sealing portion being formed at one end of the inclining portion, and the buffer portion of the sealing portion extends from the extension portion of the fastening portion to rest against the lens sheet in a bending manner, wherein the inclining portion of the sealing portion extends from the buffer portion to attach onto the lens sheet in an obliquely straight manner, and wherein the end portion of the sealing portion is a tail of the sealing portion extending to the lens sheet.

According to one embodiment of the present disclosure, an outer surface of the extension portion of the fastening portion has an inclination angle C with respect to a vertical direction, wherein the angle C is in an appropriate range of 0 to 30°.

According to one embodiment of the present disclosure, an outer surface of the inclining portion of the sealing portion has an inclination angle B with respect to a vertical direction, and the angle B is in an appropriate range of 10° to 70°.

According to one embodiment of the present disclosure, the inclining portion of the sealing portion has a length D, and the length D is in an appropriate range of 0.05 mm to 0.5 mm.

According to one embodiment of the present disclosure, the end portion of the sealing portion has a radial width E, and the width E is in a range of 0 to 0.2 mm.

According to one embodiment of the present disclosure, the buffer portion of the sealing portion has a radius R, and wherein the radius R is in an appropriate range of 0.05 mm to 1 mm.

According to another aspect of the present disclosure; the present disclosure further provides a method for manufacturing an optical lens, comprising the following steps:

confirming a position of a lens sheet relative to a main body of a lens barrel; downwardly pressing an edge fastener of the lens barrel to overlap the lens sheet with a relatively small inclination angle; and downwardly pressing the edge fastener of the lens barrel further again to overlap the lens sheet with a relatively large inclination angle, wherein the edge fastener integrally extends from the main body and is bent twice to overlap the lens sheet on the most object side, so that the lens sheet is smoothly wrapped and fixed to the lens barrel.

According to another aspect of the present disclosure, the present disclosure further provides a method for manufacturing an optical lens, comprising the following steps:

confirming a position of a lens sheet relative to a main body of a lens barrel;

laterally pressing an edge fastener of the lens barrel to overlap the lens sheet with a relatively small inclination angle; and downwardly pressing the edge fastener of the lens barrel to overlap the lens sheet with a relatively large inclination angle; wherein the edge fastener integrally extends from the main body and is bent twice to overlap the lens sheet on the most object side, so that the lens sheet is smoothly wrapped and fixed to the lens barrel.

According to another aspect of the present disclosure, the present disclosure further provides a method for manufacturing an optical lens, comprising the following steps:

confirming a position of a lens sheet relative to a main body of a lens barrel; and downwardly or laterally pressing an edge fastener of the lens barrel to overlap the lens sheet with two different inclination angles, wherein the edge fastener integrally extends from the main body and is bent twice to overlap the lens sheet on the most object side, so that the lens sheet is smoothly wrapped and fixed to the lens barrel.

According to another aspect of the present disclosure, the present disclosure further provides a method for manufacturing an optical lens, comprising the following steps:

a. confirming a position of a lens sheet relative to a main body of a lens barrel;

b. laterally pressing a part of an edge fastener of the lens barrel to partially overlap the lens sheet with a certain inclination angle; and c. relatively rotating the lens barrel, so that the edge fastener wraps the lens sheet circumferentially.

According to another aspect of the present disclosure, the present disclosure further provides a method for manufacturing an optical lens, wherein step b comprises the following steps:

b1. laterally pressing an edge fastener of the lens barrel to overlap the lens sheet with a relatively small inclination angle; and b2. laterally pressing the edge fastener of the lens barrel further again to overlap the lens sheet with a relatively large inclination angle, wherein the edge fastener integrally extends from the main body and is bent twice to overlap the lens sheet on the most object side.

Further objectives and advantages of the present disclosure will be fully embodied through the understanding of the following description and the drawings.

These and other objectives, features and advantages of the present disclosure are fully embodied by the following detailed description, drawings and claims.

DETAILED DESCRIPTION

Figure 1A:
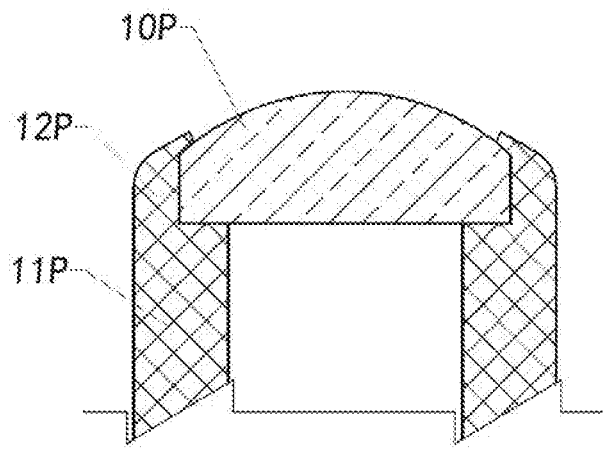
FIGS. 1A and 1B are schematic views of an existing optical lens and a pressing roller process.
Figure 1B:
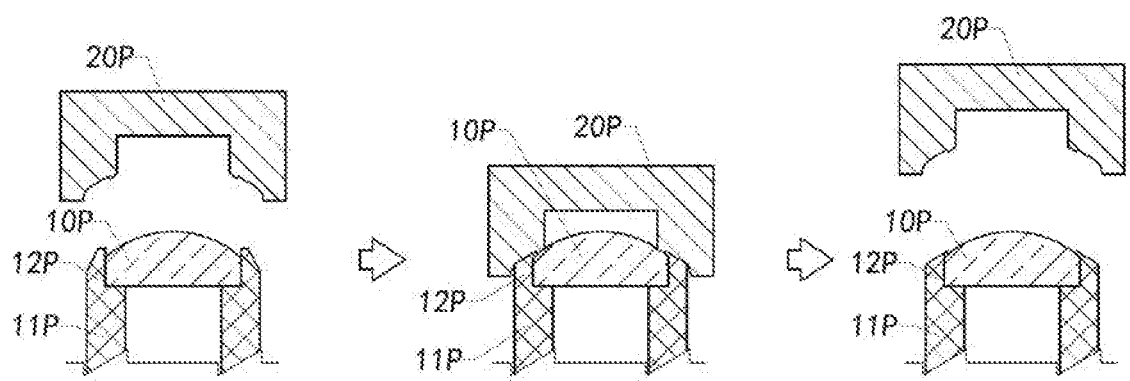

The following description is presented to disclose the present application so as to enable those skilled in the art to practice the present application. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present disclosure.

It should be understood by those skilled in the art that in the disclosure of the present application, the orientation or positional relationship indicated by the terms "longitudinal", "transverse", "upper", "lower", "front", "back", "left", "right", "vertical", "horizontal", "top", "bottom", "inside", "outside", etc. is based on the orientation or positional relationship shown in the figures, which is merely for the convenience of describing the present disclosure and simplifying the description, and does not indicate or imply that the referred apparatus or element must have a particular orientation and be constructed and operated in the particular orientation. Therefore, the above terms cannot be construed as limiting the present disclosure.

It may be understood that the term "a" should be understood to mean "at least one" or "one or more", that is, in one embodiment, the number of an element may be one, and in other embodiments, the number of the element may be multiple, and the term "a" cannot be construed as limiting the number.

The present disclosure provides an optical lens, as shown in FIGS. 2 to 12, which is suitable for being placed in an external environment for image acquisition. The optical lens has a relatively smooth appearance, which not only increases the aesthetics, but more importantly, avoids the accumulation of water mist, thereby preventing the overall sealing performance from being damaged.

A first preferred embodiment of the present disclosure is shown in FIGS. 2 to 5. The optical lens includes a lens barrel 10 and at least one lens sheet 90, wherein the lens sheet 90 is supported inside the lens barrel 10 at a certain fixed position. It is worth mentioning that the lens sheet 90 on the most object side is overlapped by the lens barrel 10 and fixed to one end of the lens barrel 10. In other words, the lens sheet 90 on the most object side is wrapped and fixed to the lens barrel 10 so as to prevent shaking or falling. At the same time, the lens barrel 10 is smoothly closed at the position of the lens sheet 90, and the overall optical lens maintains a highly consistent integrated shape. In order to facilitate the description of the substantive features of the present disclosure, the lens sheet 90 mentioned in the following refers to the outermost lens sheet, which may be relative to an object-side or image-side end of the lens barrel 10. It will not be listed here.

Figure 2:
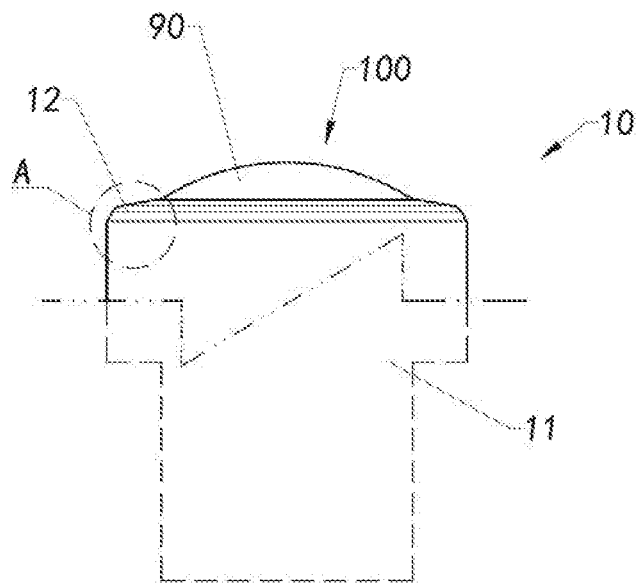
FIG. 2 is an overall side view of an optical lens according to a first preferred to embodiment of the present disclosure.
Figure 3:
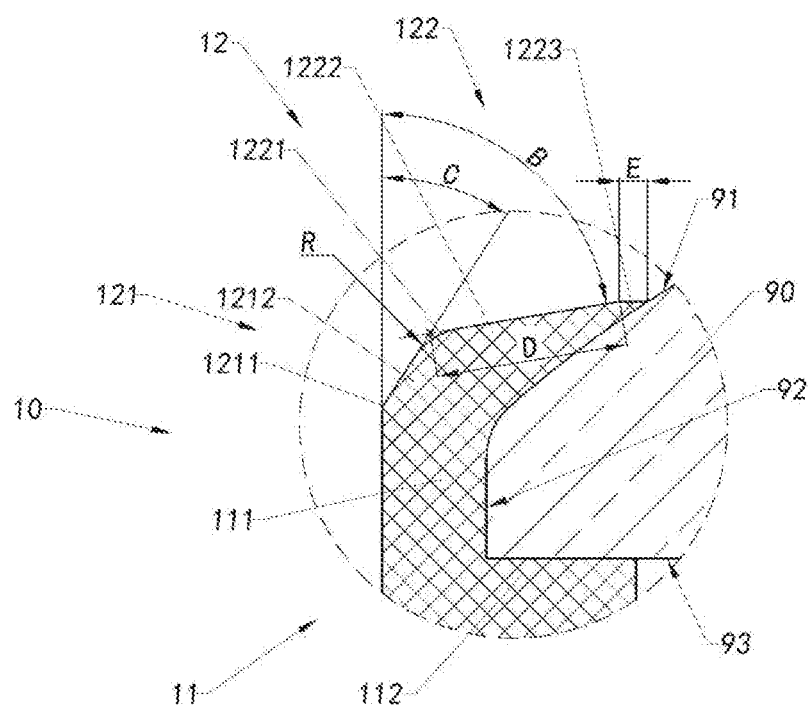
FIG. 3 is a partial enlarged view of the optical lens according to the above preferred embodiment of the present disclosure.

As shown in FIGS. 2 to 3, the lens barrel 10 includes a main body 11 and an edge fastener 12, wherein the edge fastener 12 integrally extends from the main body 11 to surround an upper surface 91 of the lens sheet 90. The main body includes a supporting edge 111 and a supporting platform 112, wherein the supporting edge 111 extends upward to provide support on a side surface 92 of the lens sheet 90, and wherein the supporting platform 112 protrudes inwardly to provide support on a lower surface 93 of the lens sheet 90. In the present preferred embodiment, the edge fastener 12 is substantially bent onto the lens sheet 90 in a manner of inclining twice. It is worth mentioning that the bending tendency of the edge fastener 12 is adapted to the curvature of the upper surface 91 of the lens sheet 90. In the case where the stability of the lens sheet on the most object side is ensured, excessive stretching and bending and excessive deformation of the lens barrel 10 is avoided at the same time, thereby improving the reliability of the overall structure.

The bending of the edge fastener 12 assists the supporting edge 111 to fix the lateral side of the lens sheet 90 to a certain extent, so that the lens sheet 90 is not only subjected to upper and lower fixing pressure but also lateral fixing pressure. Moreover, the edge fastener 12 is adaptively bordered by the upper surface 91 of the lens sheet 90, and the overall object-side appearance of the optical lens tends to bend gradually, which is advantageous for water droplets to slide down. Furthermore, an outer surface of the edge fastener 12 is a smooth arc, and the water droplets accumulated from the upper surface 91 of the lens sheet 90 can fall from the upper surface 91 of the lens sheet 90 to the outer surface of the edge fastener 12 without hindrance, and then slide down from the outer surface of the edge fastener 12 to leave the optical lens. That is to say, there is no accumulating dent between the lens sheet 90 and the lens barrel 10, or in the lens barrel 10 itself, and there is no protrusion that prevents the advancement of water droplets, thereby speeding up the dissipation of water mist, and ensuring that the sealing performance is not affected.

Furthermore, the edge fastener 12 includes a fastening portion 121 and a sealing portion 122, wherein the sealing portion 122 extends from the fastening portion 121 and is attached to the upper surface 91 of the lens sheet 90. In the present preferred embodiment, the fastening portion 121 and the sealing portion 122 of the edge fastener 12 have different degrees of inclination. With relative to a vertical outer wall of the main body 11, the sealing portion 122 has a greater inclination angle than that of the fastening portion 121. Then, the outer surface of the edge fastener 12 is connected to the upper surface 91 of the lens sheet 90 to form a roughly arched shape, which thus serves as a diversion surface to facilitate the dissipation of water mist without affecting the image quality.

Inner surfaces of the fastening portion 121 and the sealing portion 122 are both tightly abutted onto the lens sheet 90, so that there is no gap between the edge fastener 12 and the lens sheet 90, thereby ensuring the closed environment of the lens sheet 90. FIG. 3 is an enlarged schematic view of part A in FIG. 2. The edge fastener 12 in the present preferred embodiment mainly overlaps the upper surface 91 of the lens sheet 90. That is, the supporting edge 111 of the main body 11 is attached to the side surface 92 of the lens sheet 90, and the fastening portion 121 and the sealing portion 122 of the edge fastener 12 are attached to the upper surface 91 of the lens sheet 90. Furthermore, during the deformation of the edge fastener 12, the upper surface 91 of the lens sheet 90 is subjected to pressure.

In other words, the edge of the upper surface 91 of the lens sheet 90 is overlapped by the edge fastener 12, the side surface 92 of the lens sheet 90 is surrounded by the supporting edge 111, and the lower surface 93 of the lens sheet 90 is supported by the support platform 112. Furthermore, the edge fastener 12 deforms under pressure to wrap the lens sheet 90. Specifically, the edge fastener 12 of the present preferred embodiment is bent in two sections. Specifically, they are the fastening portion 121 and the sealing portion 122. More specifically, the fastening portion 121 includes a bending portion 1211 and an extension portion 1212, wherein the bending portion 1211 extends from the supporting edge 111 to rest against the lens sheet 90 in a bending manner, and wherein the extension portion 1212 extends from the bending portion 1211 to attach onto the lens sheet 90 in an obliquely straight manner. The sealing portion 122 includes a buffer portion 1221 and an inclining portion 1222, and an end portion 1223 of the sealing portion 122 is formed at one end of the inclining portion 1222. The buffer portion 1221 of the sealing portion 122 extends from the extension portion 1212 of the fastening portion 121 to rest against the lens sheet 90 in a bending manner, wherein the inclining portion 1222 of the sealing portion 122 extends from the buffer portion 1221 to attach onto the lens sheet 90 in an obliquely straight manner. The end portion 1223 of the sealing portion 122 is a tail of the sealing portion 122 extending to the lens sheet 90. In some other embodiments, the end portion 1223 is joined to the inclining portion 1222 to be obviously bordered by the lens sheet 90.

Specifically, for ease of understanding, an outer surface of the extension portion 1212 of the fastening portion 121 has an inclination angle C with relative to the outer wall. The fastening portion 121 can increase the length of the bending deformation of the material when the edge fastener 12 is deformed, thereby reducing the amount of bending deformation per unit area, so that the material of the edge fastener 12 is not easily broken while ensuring that the amount of bending deformation is within a tolerance range of the material. Preferably, the angle C is recommended to be in an appropriate range of 0 to 30°.

In addition, an outer surface of the inclining portion 1222 of the sealing portion 122 has an inclination angle B with relative to the outer wall. The outer surface of the inclining portion 1222 of the sealing portion 122 is substantially consistent with a tangential direction of an edge surface of the upper surface 91 of the lens sheet 90, which is advantageous for water droplets on the upper surface 91 of the lens sheet 90 to slide down during use of the optical lens, without affecting the imaging quality of the optical lens, and is also advantageous for the aesthetics of the optical lens at the same time. Preferably, the angle B is recommended to be in an appropriate range of 10° to 70°.

In addition, the inclining portion 1222 of the sealing portion 122 has a length D, and wherein a range of the length D is designed according to a locking force required by the optical lens, which is advantageous to increase the locking force for internal components of the optical lens, prevent the problems such as loosening of the optical lens, and is advantageous to cover the chamfer of the lens sheet 90 and increase the aesthetics at the same time. Preferably, the length D is recommended to be in an appropriate range of 0.1 mm to 0.5 mm.

In addition, the end portion 1223 of the sealing portion 122 has a radial width E. Since the deformation process of the edge fastener 12 involves a necking process, the greater the thickness of the opening region is, the greater the internal stress will be generated when the edge fastener 12 is deformed. Preferably, the end portion 1223 ensures that the width E is in a range of 0 to 0.2 mm, which can avoid larger internal stress due to deformation and at the same time reduce the risk of locking force reduction due to the internal stress.

In addition, the buffer portion 1221 of the sealing portion 122 has a radius R. In the case of the same bending angle, the larger the radius R value is, the smaller the stretching of the material is, so that the roll edge material is not easy to break, and the bending deformation is ensured to be within the tolerance range of the material. It can be understood that the radius R value of the buffer portion 1221 of the sealing portion 122 is determined by the angle of the deformation under pressure and the wall thickness of the bending region. Preferably, the radius R is recommended to be in an appropriate range of 0.1 mm to 1 mm. Moreover, the bending portion 1211 of the fastening portion 121 also has a bending angle similarly, and its effect is similar to the radius R.

It is worth mentioning that the above values are all substantive features of the outer shape of the edge fastener 12, thereby ensuring that the edge fastener 12 is beautiful and has an effect of forming a diversion surface. Moreover, the deformation received by the edge fastener 12 has a ring-shaped inward characteristic.

Figure 4:
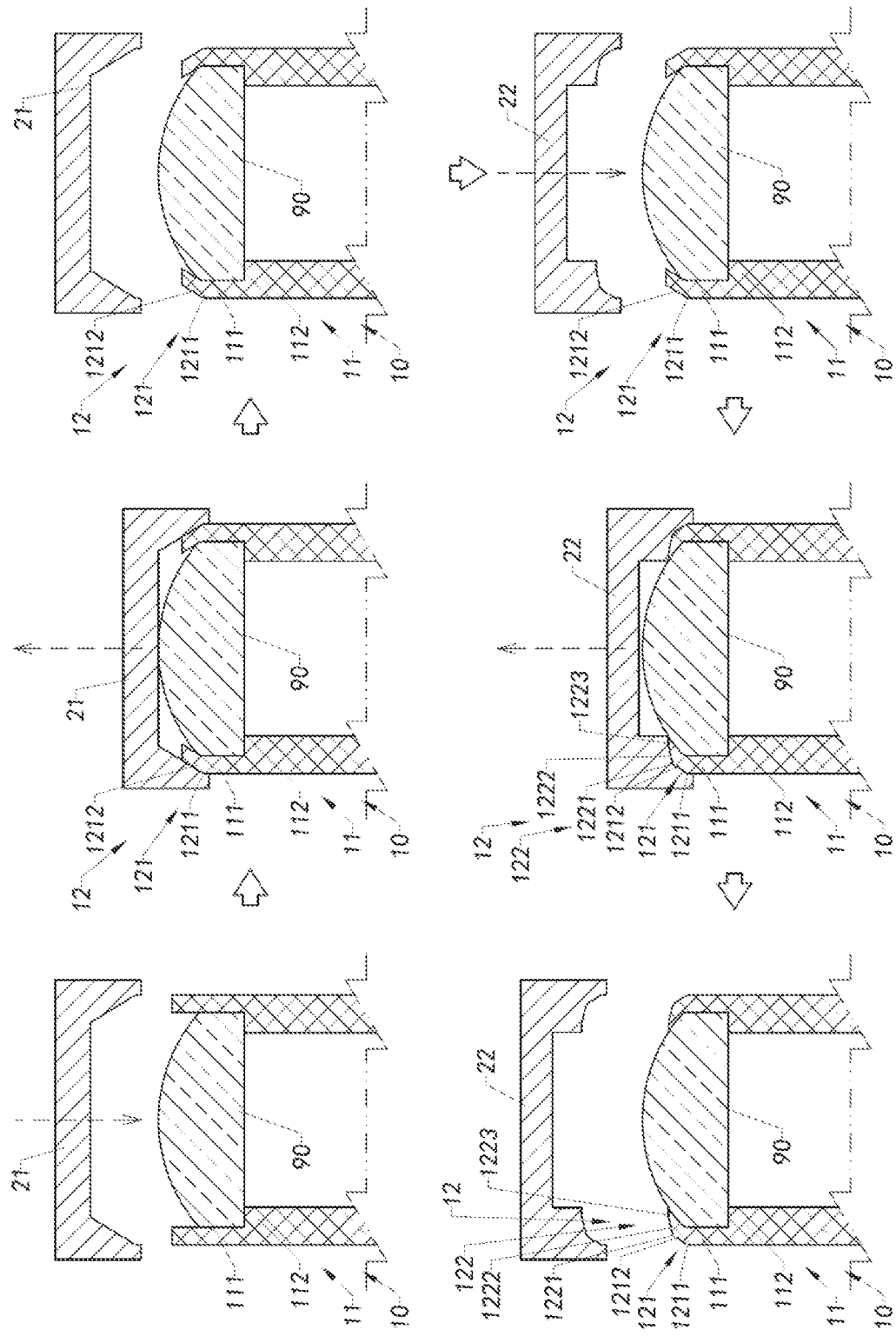
FIG. 4 is schematic flow side views of a method for manufacturing the optical lens according to the above preferred embodiment of the present disclosure.
Figure 5:
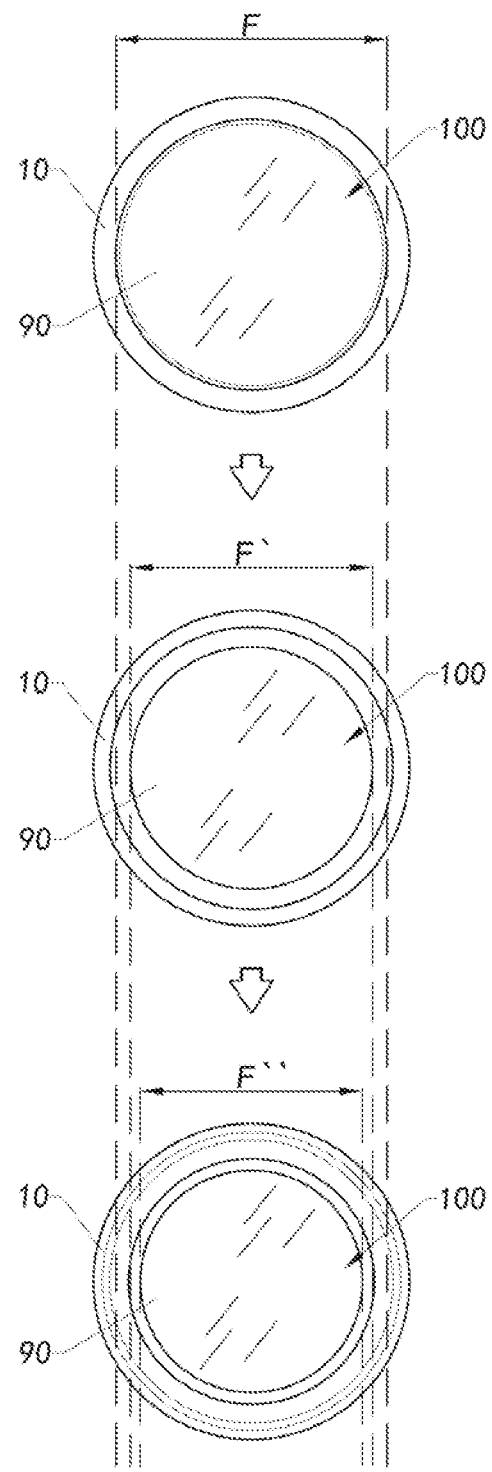
FIG. 5 is schematic flow top views of the method for manufacturing the optical lens according to the above preferred embodiment of the present disclosure.

More specifically, a process of manufacturing the optical lens is as shown in FIGS. 4 and 5. A diameter of an opening 100 at one end of the lens barrel 10 is gradually and uniformly reduced in the manufacturing process. The method for manufacturing the optical lens includes the following steps:

confirming a position of the lens sheet 90 relative to the main body 11 of the lens barrel 10;

downwardly pressing an edge fastener 12 of the lens barrel 10 to overlap the lens sheet 90 with a relatively small inclination angle; and downwardly pressing the edge fastener 12 of the lens barrel 10 further again to overlap the lens sheet 90 with a relatively large inclination angle.

As shown in FIGS. 4 to 5, the manufacturing method is completed by a mold indenter. In the present embodiment, a first indenter 21 and a second indenter 22 are included, which are two pressing molds with different pressure applying modes. Of course, in order to facilitate production and save costs, the mold indenter can use the same mold tool or the same indenter means. Therefore, in order not to confuse the essential features of the present disclosure, it will not be repeated here.

After the lens sheet 90 has been placed in the main body 11 of the lens barrel 10, the edge fastener 12 is ready to be deformed to lock the lens sheet 90 in the lens barrel 10. The opening 100 of the lens barrel 10 has an opening with a diameter of F. Preferably, the lens sheet 90 has been adjusted and tested and has a position that can be fixed. Then, the first indenter 21 downwardly presses the edge fastener 12 to form the fastening portion 121. Therefore, the lens sheet 90 is fixed once and has an outer surface with a certain inclination angle. The opening 100 of the lens barrel 10 has an opening with a diameter of F', and F'<F, After the first indenter 21 is removed, the second indenter 22 downwardly presses the edge fastener 12 to form the sealing portion 122. The opening 100 of the lens barrel 10 has an opening with a diameter of F", and F"<F'. Therefore, the lens sheet 90 is fixed twice and has a two-section outer surface, which facilitates the extension of the arc of the upper surface 91 of the lens sheet 90 without hindrance, so that it is smooth as a whole.

It needs to be noted that the lens sheet 90 is primarily pre-fixed and then secondarily sealed, so that the position of the lens sheet 90 is not easily moved, avoiding adverse shaking effects on the imaging optical path.

Figure 6:
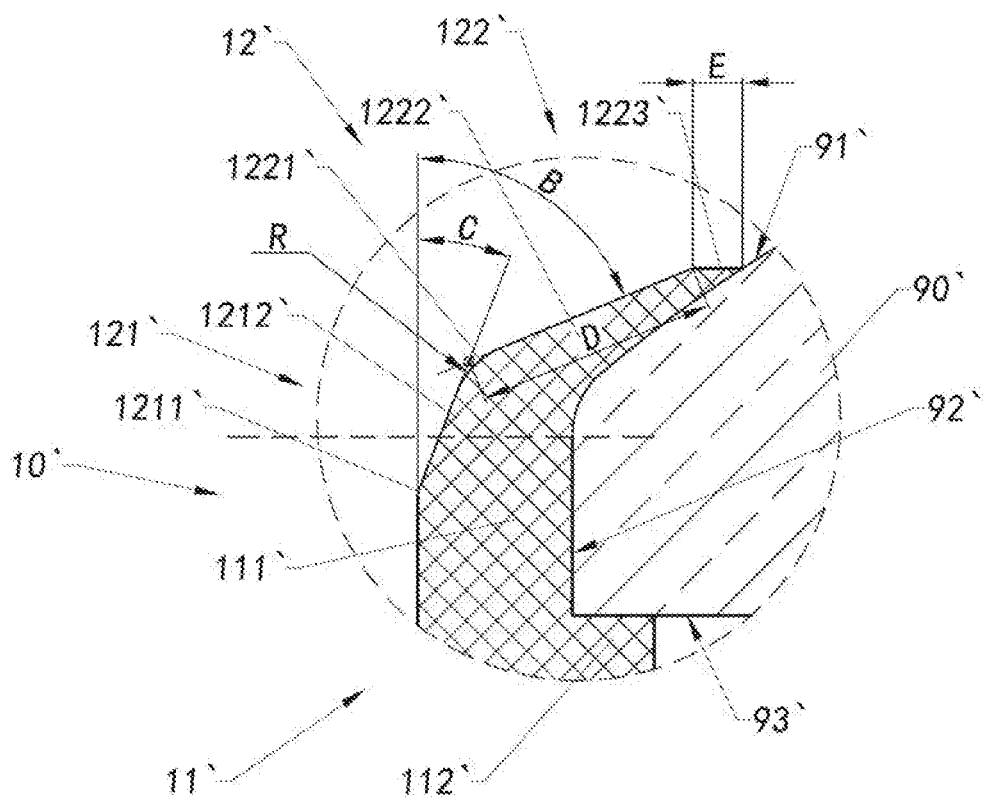
FIG. 6 is a partial enlarged view of an optical lens according to a second preferred embodiment of the present disclosure.
Figure 7:
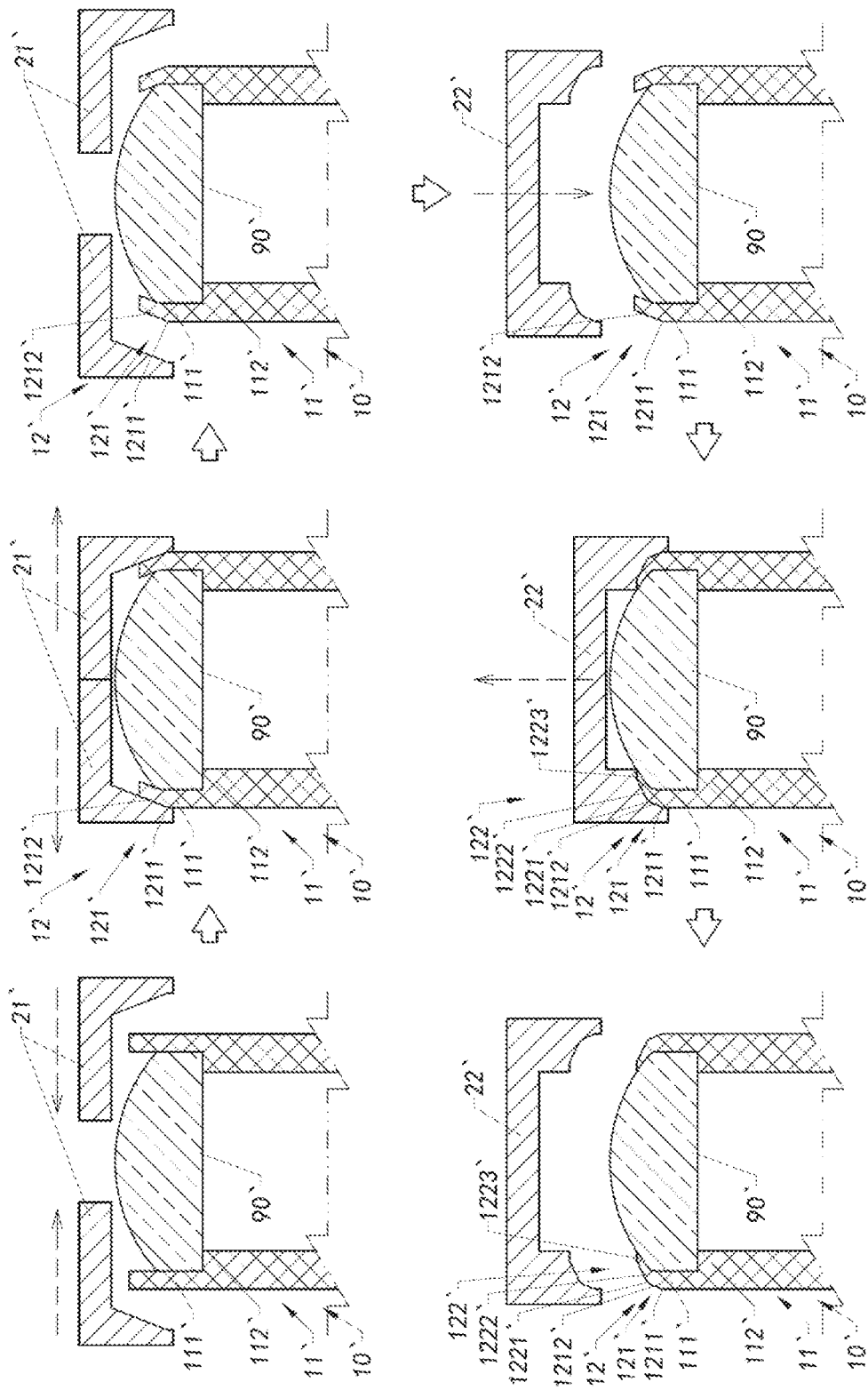
FIG. 7 is schematic flow side views of a method for manufacturing the optical lens according to the above preferred embodiment of the present disclosure.
Figure 8:
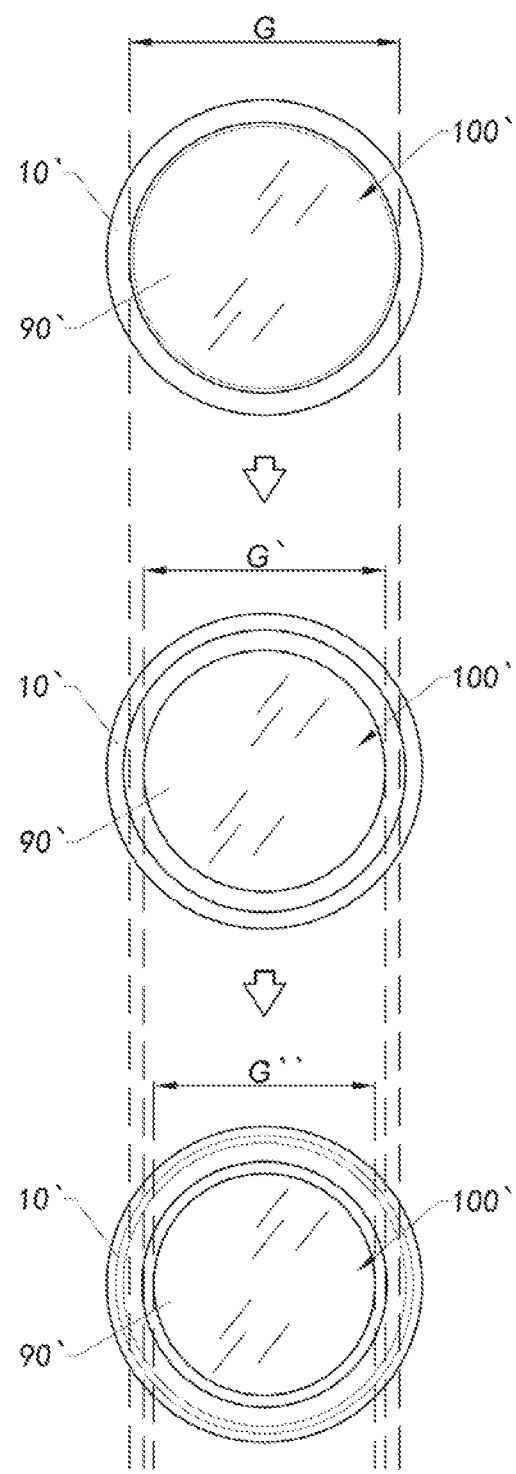
FIG. 8 is schematic flow top views of the method for manufacturing the optical lens according to the above preferred embodiment of the present disclosure.

An optical lens of a second preferred embodiment of the present disclosure is illustrated, as shown in FIGS. 6 to 8, wherein the optical lens includes a lens barrel 10' and at least one lens sheet 90', and wherein the structure of the lens sheet 90' is similar to that of the lens sheet 90 of the optical lens of the first preferred embodiment, and it is not repeated in the present disclosure.

Similar to the first preferred embodiment, the lens barrel 10' of the optical lens in the present preferred embodiment has a larger opening 100'. Specifically, the main body 11' of the lens barrel 10' is similar to the main body 11 of the first preferred embodiment, but the edge fastener 12' is different.

The edge fastener 12' includes a fastening portion 121' and a sealing portion 122', wherein the sealing portion 122' extends from the fastening portion 121' and is attached to the upper surface 91' of the lens sheet 90', and wherein the fastening portion 121' extends from the main body 11' and is attached to the side surface 92' of the lens sheet 90'. In the present preferred embodiment, the fastening portion 121' and the sealing portion 122' of the edge fastener 12' have different slopes.

It is worth mentioning that inner surfaces of the fastening portion 121' and the sealing portion 122' are both tightly abutted onto the lens sheet 90', so that there is no gap between the edge fastener 12' and the lens sheet 90', ensuring the closed environment of the lens sheet 90'. FIG. 6 is an enlarged schematic view of a position of part A in FIG. 2. In the present preferred embodiment, in addition to overlapping the upper surface 91' of the lens sheet 90', the edge fastener 12' also wraps the side surface 92' of the lens sheet 90'. In other words, the supporting edge 111' of the main body 11' is attached to a lower half of the side surface 92' of the lens sheet 90', the fastening portion 121' of the edge fastener 12' is attached to an upper half of the side surface 92' of the lens sheet 90', and the sealing portion 122' is attached to the upper surface 91' of the lens sheet 90'. Furthermore, during the deformation of the edge fastener 12', the upper surface 91' and the side surface 92' of the lens sheet 90' are both subjected to pressure, so that the lens sheet 90' is subjected to pressure from different angles and thus fixed.

The present preferred embodiment is different in that the upper surface 91' and the side surface 92' of the lens sheet 90' are both overlapped by the edge fastener 12'. Furthermore, the edge fastener 12' is deformed by pressure twice from different directions so as to wrap the lens sheet 90'. Specifically, the edge fastener 12' of the present preferred embodiment is bent in two sections, which are specifically the fastening portion 121' and the sealing portion 122'. Furthermore, the specific shapes of the fastening portion 121' and the sealing portion 122' are similar to those in the first preferred embodiment. The deformation of the lens barrel 10' has certain uniformity, which is advantageous for no local squeezing and/or stretching traces in the circular edge. The lens barrel 10' not only avoids excessive stretching in the radial direction after processing, but also maintains the uniformity of the material in the circumferential direction, so that the overall force is averaged, thereby reducing the possibility of breakage.

Specifically, an outer surface of the extension portion 1212' of the fastening portion 121' has an inclination angle C with relative to the vertical direction. The fastening portion 121' can increase the length of the bending deformation of the material when the edge fastener 12' is deformed, thereby reducing the amount of bending deformation per unit area, so that the material of the edge fastener 12' is not easily broken while ensuring that the amount of bending deformation is within the tolerance range of the material. Preferably, the angle C is recommended to be in an appropriate range of 5° to 25°.

In addition, an outer surface of the inclining portion 1222' of the sealing portion 122' has an inclination angle B with relative to the vertical direction. The outer surface of the inclining portion 1222' of the sealing portion 122' is substantially consistent with a tangential direction of an edge surface of the upper surface 91' of the lens sheet 90', which is advantageous for water droplets on the upper surface 91' of the lens sheet 90' to slide down during use of the optical lens, without affecting the imaging quality of the optical lens, and is also advantageous for the aesthetics of the optical lens at the same time. Preferably, the angle B is recommended to be in an appropriate range of 15° to 65°.

In addition, the inclining portion 1222' of the sealing portion 122' has a length D, wherein a range of the length D is designed according to a locking force required by the optical lens, which is advantageous to increase the locking force for internal components of the optical lens, prevent the problems such as loosening of the optical lens, and is advantageous to cover the chamfer of the lens sheet 90' and increase the aesthetics at the same time. Preferably, the length D is recommended to be in an appropriate range of 0.1 mm to 0.45 mm.

In addition, the end portion 1223' of the sealing portion 122' has a radial width E. Since the deformation process of the edge fastener 12' involves a necking process, the greater the thickness of the opening region is, the greater the internal stress will be generated when the edge fastener 12' is deformed. Preferably, the end portion 1223' ensures that the width E is in a range of 0 to 0.2 mm, which can avoid larger internal stress due to deformation and at the same time reduce the risk of locking force reduction due to the internal stress.

In addition, the buffer portion 1221' of the sealing portion 122' has a radius R. In the case of the same bending angle, the larger the radius R value is, the smaller the stretching of the material is, so that the roll edge material is not easy to break, and the bending deformation is ensured to be within the tolerance range of the material. It can be understood that the radius R value of the buffer portion 1221' of the sealing portion 122' is determined by the angle of the deformation under pressure and the wall thickness of the bending region. Preferably, the radius R is recommended to be in an appropriate range of 0.1 mm to 1 mm. Moreover, the bending portion 1211' of the fastening portion 121' also has a bending angle similarly, and its effect is similar to the radius R.

It is worth mentioning that the processing method of the edge fastener 12', as shown in FIGS. 7 and 8, is also different from that in the first preferred embodiment. The diameter of the opening 100' at one end of the lens barrel 10' is gradually and uniformly reduced during the manufacturing process, and in the case where the diameter G of the opening 100" is approximately equal to F, G" is greater than the diameter F''' in the first embodiment.

The method for manufacturing the optical lens includes the following steps:

confirming a position of the lens sheet 90' relative to the main body 11' of the lens barrel 10';

laterally pressing the edge fastener 12' of the lens barrel 10' to overlap the lens sheet 90' with a relatively small inclination angle; and downwardly pressing the edge fastener 12' of the lens barrel 10' to overlap the lens sheet 90' with a relatively large inclination angle.

As shown in FIG. 7, the manufacturing method is completed by a mold indenter. In the present embodiment, a first indenter 21' and a second indenter 22' are included, which are two pressing molds with different pressure applying modes. Of course, in order to facilitate production and save costs, the mold indenter can use the same mold tool or the same indenter means. Therefore, in order not to confuse the essential features of the present disclosure, it will not be repeated here.

After the lens sheet 90' has been placed in the main body 11' of the lens barrel 10', the edge fastener 12' is ready to be deformed to lock the lens sheet 90' in the lens barrel 10'. The opening 100' of the lens barrel 10' has an opening with a diameter of G. Preferably, the lens sheet 90' has been adjusted and tested and has a position that can be fixed. Then, the first indenter 21' radially presses the edge fastener 12' to form the fastening portion 121'. Therefore, the side surface 92' of the lens sheet 90' is fixed once and has an outer surface with a certain inclination angle. The opening 100' of the lens barrel 10' has an opening with a diameter of G', and G'<G. After the first indenter 21' is removed, the second indenter 22' downwardly presses the edge fastener 12' to form the sealing portion 122'. The opening 100' of the lens barrel 10' has an opening with a diameter of G", and G"<G'. Therefore, the lens sheet 90' is fixed in different directions twice and has a two-section outer surface, which facilitates the extension of the arc of the upper surface 91' of the lens sheet 90' without hindrance, so that it is smooth as a whole.

Moreover, not only the lens sheet 10' is clamped and fixed up and down, but also the relative position of the lens sheet 10' is more stabilized by circumferential fixing, thereby avoiding the movement of the lens sheet position due to shaking during use. The secondary pressing can supplement the gap that may occur in the primary pressing, thereby avoiding the occurrence of the gap between the lens barrel 10' and the lens sheet 90' in the processing of the lens barrel 10', ensuring that the lens sheet 90' is tightly fixed, and ensuring the hermetical closure of the overall optical lens.

The present preferred embodiment simplifies the flexibility requirements for materials, so that there is more room for choice in material selection or processing methods. For example, the hot-pressing temperature, the material plasticity requirements or the like may be reduced.

Figure 9:
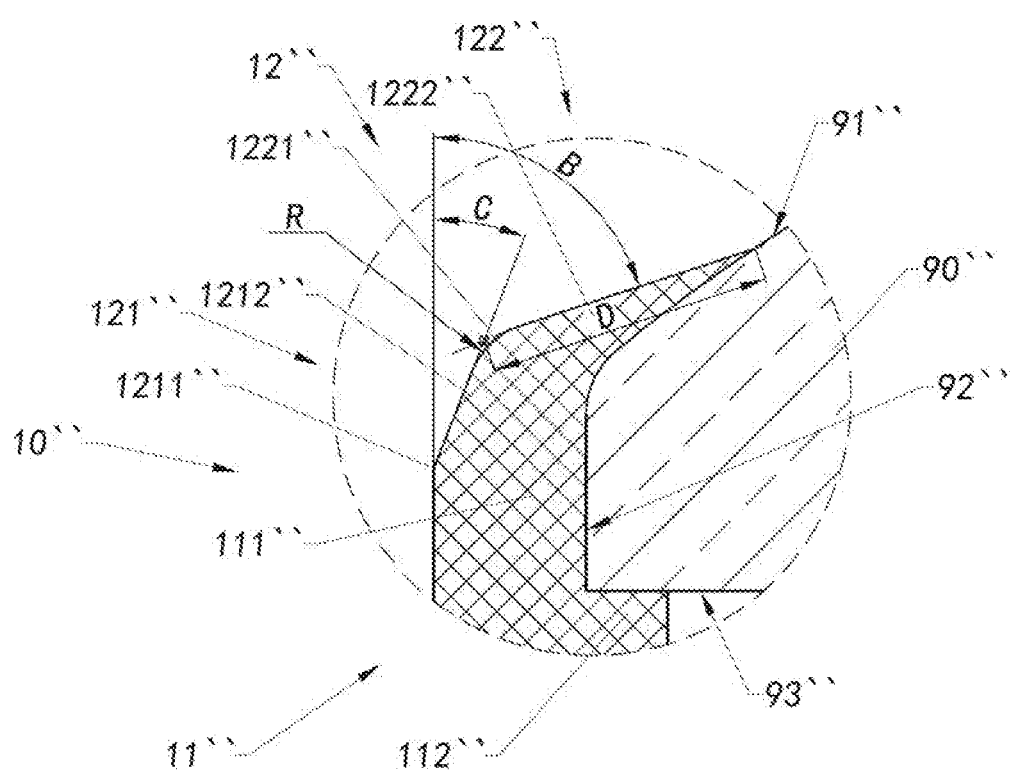
FIG. 9 is a partial enlarged view of an optical lens according to a third preferred embodiment of the present disclosure.
Figure 10:
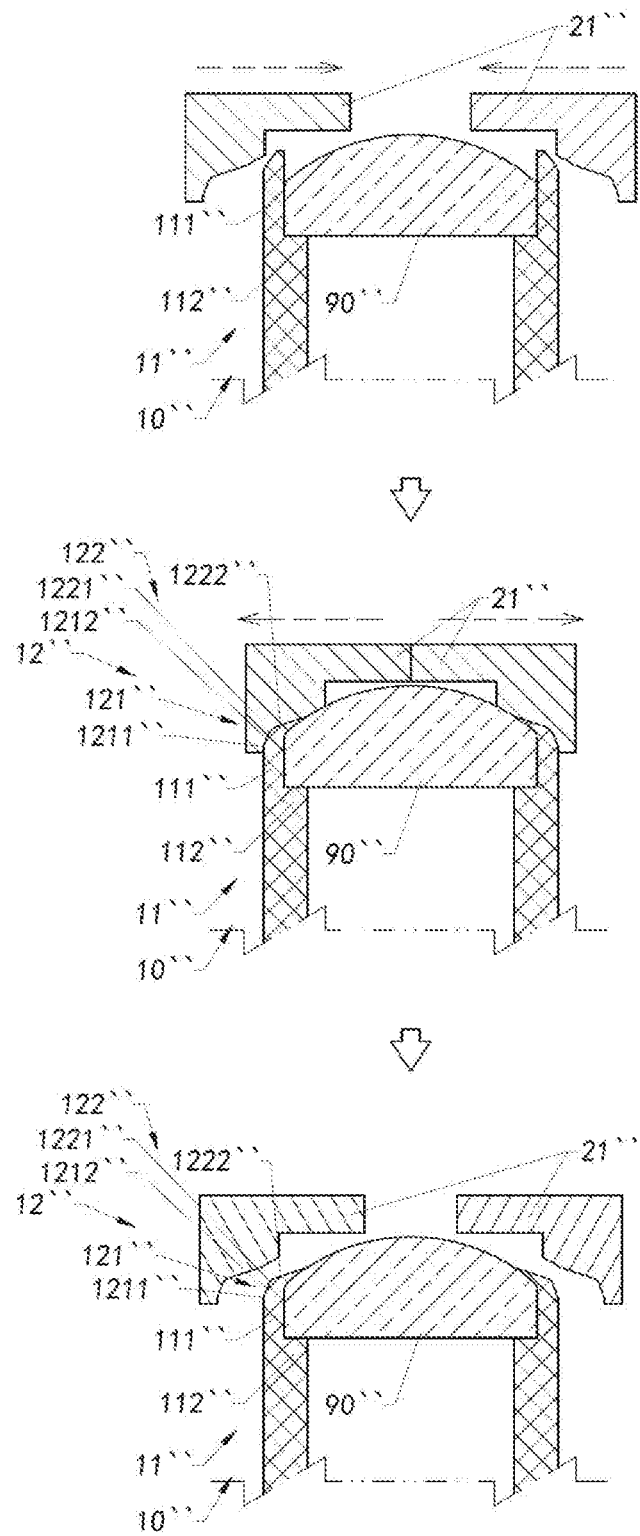
FIG. 10 is schematic flow side views of a method for manufacturing the optical lens according to the above preferred embodiment of the present disclosure.

An optical lens of a third preferred embodiment of the present disclosure is illustrated, as shown in FIGS. 9 to 10, wherein the optical lens includes a lens barrel 10" and at least one lens sheet 90", and wherein the structure of the lens sheet 90" is similar to that of the lens sheet 90 of the optical lens of the first preferred embodiment, and it is not repeated in the present disclosure.

It is different from the above preferred embodiments in that the edge fastener 12" is pressed and deformed once to form a two-section slope wrapping the lens sheet 90". As shown in FIG. 9, an example where the sealing portion 122" of the edge fastener 12" has no so-called end portion is taken here for illustration.

By utilizing the design where the edge fastener 121" corresponds to the upper surface 91" of the lens sheet 90" before it is deformed, the edge fastener 121" is pressed to be bordered by the lens sheet 90" according to a tangential direction. That is to say, as shown in FIG. 10, the thickness near the edge of the opening of the lens barrel 10" is thinner, which is significantly different from the thickness of the lens barrel 10".

In the method for manufacturing the optical lens, only the first indenter 21" that applies pressure laterally is required, and the inner shape of the first indenter 21" is correspondingly configured so as to satisfy the needs of the lens sheet 90" and the edge fastener 12".

Specifically, the manufacturing method includes the following steps:

confirming a position of the lens sheet 90" relative to the main body 11" of the lens barrel 10"; and laterally pressing the edge fastener 12" of the lens barrel 10" to overlap the lens sheet 90" with two different inclination angles.

More specifically, after the lens sheet 90" has been placed in the main body 11" of the lens barrel 10", the edge fastener 12" is ready to be deformed to lock the lens sheet 90" in the lens barrel 10". The opening 100" of the lens barrel 10" has an opening with a diameter of G1. Preferably, the lens sheet 90" has been adjusted and tested and has a position that can be fixed. Then, the first indenter 21" radially presses the edge fastener 12" to form the fastening portion 121" and the sealing portion 122". Therefore, the side surface 92" and the upper surface 91" of the lens sheet 90" is fixed and has an outer surface with a certain inclination angle. The opening of the lens barrel 10" has an opening with a diameter of G2, and G2<G1. That is to say, the lens sheet 90" is fixed in two different directions at one time and has a two-section outer surface, which facilitates the extension of the arc of the upper surface 91" of the lens sheet 90" without hindrance, so that s smooth as a whole.

Figure 11:
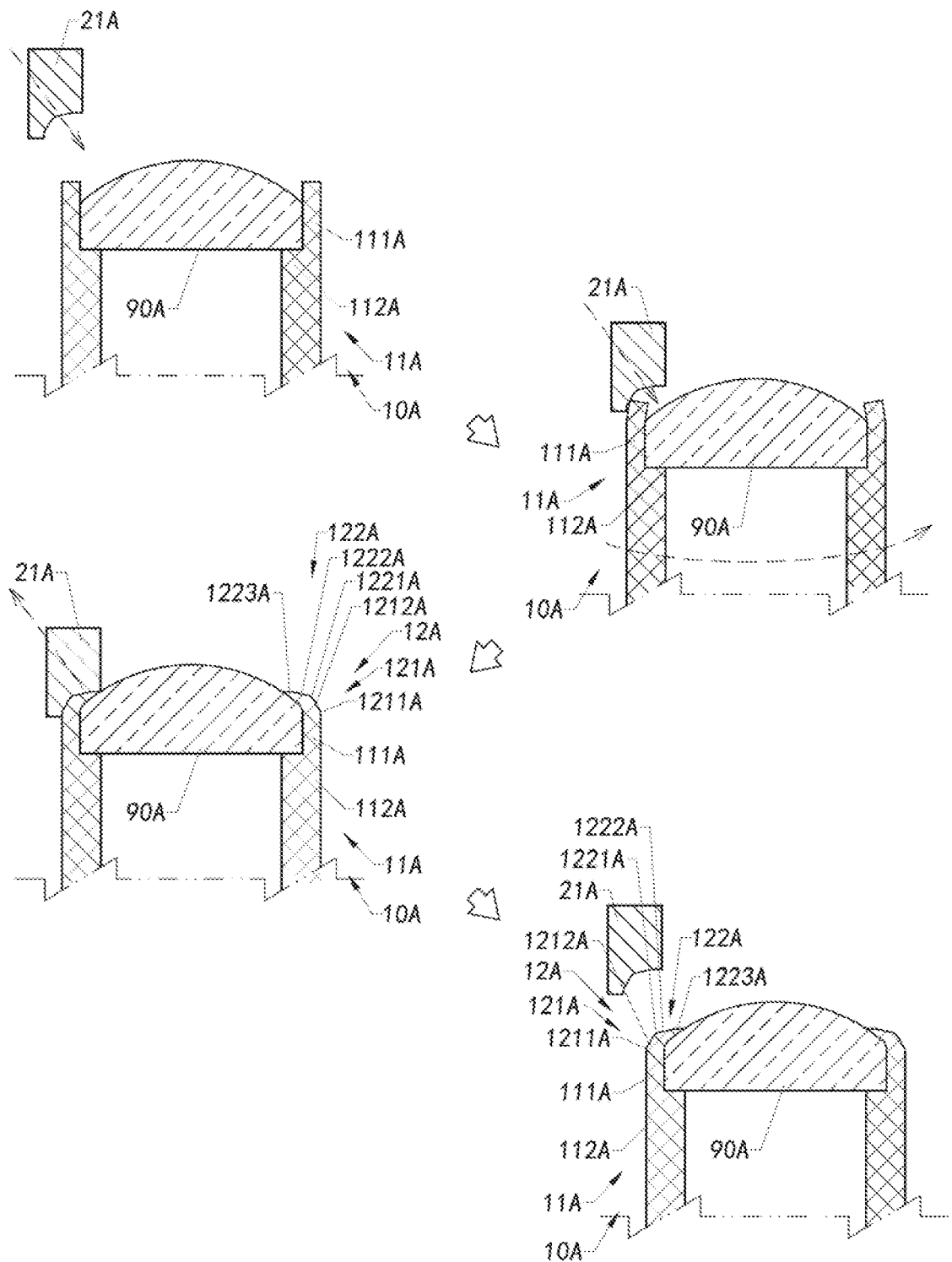
FIG. 11 is schematic flow side views of a method for manufacturing an optical lens according to a fourth preferred embodiment of the present disclosure.

An optical lens of a fourth embodiment of the present disclosure is as shown in FIG. 11 and its structure is similar to those of the above embodiments, and will not be repeated here. In order to highlight the substantial progress of the present disclosure, it is emphasized that the method for manufacturing the optical lens includes the following steps;

confirming a position of the lens sheet 90A relative to the main body 11A of the lens barrel 10A;

laterally pressing an edge fastener 12A of the lens barrel 10A to overlap the lens sheet 90A with a certain inclination angle; and relatively rotating the lens barrel 10A, so that the edge fastener 12A wraps the lens sheet 90A circumferentially.

As shown in FIG. 11, the manufacturing method is completed by an indenter 21A. The indenter 21A first obliquely presses against a part of the edge fastener 12A on the circumference. Then, the lens barrel 10A is rotated at least one round, so that the indenter 21A also uniformly presses against the edge fastener 12A for one round, until the round edge setting is completed. Finally, the indenter 21A is withdrawn to complete the manufacturing of the optical lens. Such a roll-edge flexible manufacturing effectively reduces the possibility of the lens sheet 90A being scratched, and improves the overall manufacturing yield of the optical lens.

It needs to be noted that the pressing direction and the withdrawal direction of the indenter 21A are opposite.

In addition, in other embodiments, the direction of the indenter 21A may be in a vertical relationship with the lens barrel 10A. That is to say, when the lens barrel 10A is placed vertically, the indenter 21A is pressed and withdrawn in the horizontal direction.

Furthermore, the indenter 21A is also pressed into different positions by multiple times, for example, the fastening portion 121A is pressed for the first time, and after being withdrawn, the sealing portion 122A is pressed for the second time. For the lens barrel 10A made of different materials, the indenter performing pressing for multiple times may also directly transfer the pressure position without being withdrawn in the middle.

Figure 12:
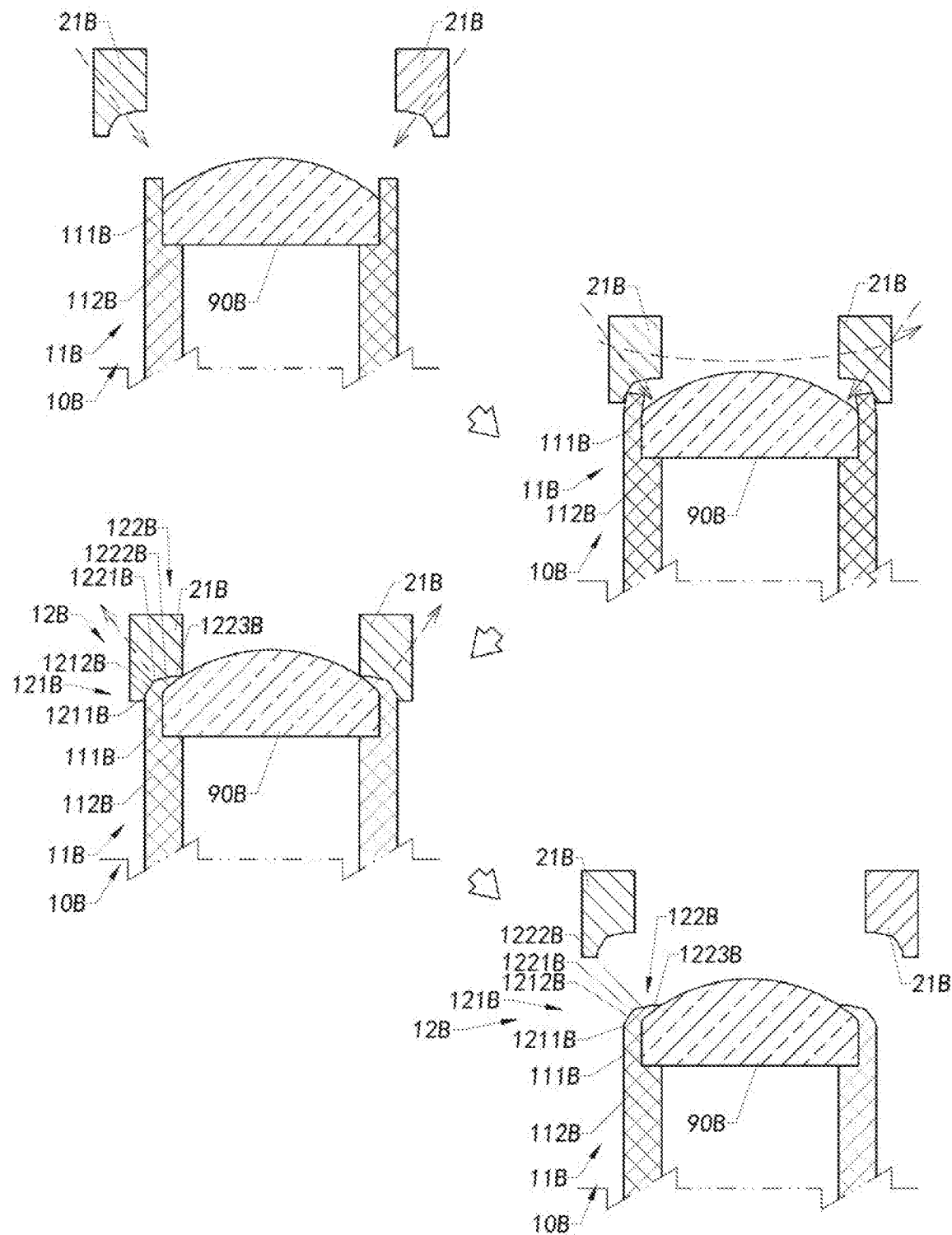
FIG. 12 is schematic flow side views of a method for manufacturing an optical lens according to a fifth preferred embodiment of the present disclosure.

A fifth embodiment of the present disclosure is as shown in FIG. 12, and is different from the above fourth embodiment in that in the present preferred embodiment, the indenter 21B is rotated, and the lens barrel 10B is relatively stable and does not rotate.

Specifically, after the lens sheet 90B has been placed in the main body 11B of the lens barrel 10B, the edge fastener 12B is ready to be deformed to lock the lens sheet 90B in the lens barrel 10B. Preferably, the lens sheet 90B has been adjusted and tested and has a position that can be fixed. Then, the indenter 21B obliquely presses a part of the edge fastener 12B. Then, the indenter 21B is rotated relative to the lens barrel 10B to form the fastening portion 121B and the sealing portion 122B on the edge fastener 12B.

In the present preferred embodiment, there are two indenters 21B oppositely arranged, and after each is rotated by a half of round, the edge fastener 12B is completely shaped. The manufacturing process is relatively speeded up. Moreover, the lens barrel 10B is stably placed, reducing the possibility of displacement of the lens sheet 90B.

It is worth mentioning that the outer surface of the sealing portion 122B of the edge fastener 12B and the outer surface of the lens sheet 90A have the same or similar slope, which is advantageous for water droplets to slide down from the outer surface of the lens sheet 90A to the outer surface of the sealing portion 122B and then to the outside of the lens barrel 10B. There is no hindrance to the sliding-down process of water droplets. In particular, it is not limited to the above manufacturing method. The structure of the edge fastener 12B will not be substantially affected by the manufacturing method.

It should be understood by those skilled in the art that the embodiments of the present disclosure described in the above description and shown in the drawings are only exemplary and not limiting to the present disclosure. The objectives of the present disclosure have been achieved completely and efficiently. The function and structural principles of the present disclosure have been presented and described in the embodiments, and the embodiments of the present disclosure may be varied or modified without departing from the principles.

The invention claimed is:

1. An optical lens, comprising:
a lens barrel and at least one lens sheet fixed in the lens barrel, wherein the lens sheet on the most object side is overlapped by the lens barrel on a side surface and an upper surface of the lens sheet, wherein the lens barrel comprises a main body and an edge fastener, and wherein the edge fastener integrally extends from the main body and overlaps the lens sheet on the most object side, so that the lens sheet is smoothly wrapped and fixed to the lens barrel;
wherein the edge fastener comprises a fastening portion and a sealing portion, wherein the sealing portion extends from the fastening portion and is attached to the upper surface of the lens sheet;
wherein the sealing portion comprises a buffer portion and an inclining portion, with an end portion of the sealing portion being formed at one end of the inclining portion, and the buffer portion of the sealing portion extends from the fastening portion to rest against the lens sheet in a bending manner, wherein the inclining portion of the sealing portion extends from the buffer portion to attach onto the lens sheet in an obliquely straight manner, and wherein the end portion of the sealing portion is a tail of the sealing portion extending to the lens sheet.

2. The optical lens according to claim 1, wherein the edge fastener is substantially bent onto the lens sheet in a manner of inclining twice.

3. The optical lens according to claim 1, wherein a bending tendency of the edge fastener is adaptively bordered by a curvature of the upper surface of the lens sheet.

4. The optical lens according to claim 1, wherein the fastening portion and the sealing portion of the edge fastener have different degrees of inclination.

5. The optical lens according to claim 4, wherein the sealing portion has an inclination angle greater than that of the fastening portion with respect to a vertical direction.

6. The optical lens according to claim 4, wherein an outer surface of the edge fastener is connected to the upper surface of the lens sheet to form a roughly arched shape.

7. The optical lens according to claim 4, wherein inner surfaces of the fastening portion and the sealing portion are both tightly abutted onto the lens sheet, so that there is no gap between the edge fastener and the lens sheet.

8. The optical lens according to claim 4, wherein the fastening portion comprises a bending portion and an extension portion, wherein the bending portion extends from a supporting edge of the main body to rest against the lens sheet in a bending manner, wherein the extension portion extends from the bending portion to attach onto the lens sheet in an obliquely straight manner, wherein the buffer portion of the sealing portion extends from the extension portion of the fastening portion to rest against the lens sheet in the bending manner.

9. The optical lens according to claim 8, wherein an outer surface of the extension portion of the fastening portion has an inclination angle C with respect to a vertical direction, and wherein the angle C is in an appropriate range of 0 to 30°.

10. The optical lens according to claim 8, wherein an outer surface of the inclining portion of the sealing portion has an inclination angle B with respect to a vertical direction, and the angle B is in an appropriate range of 10° to 70°.

11. The optical lens according to claim 8, wherein the inclining portion of the sealing portion has a length D, and the length D is in an appropriate range of 0.05 mm to 0.5 mm.

12. The optical lens according to claim 8, wherein the end portion of the sealing portion has a radial width E, and the width E is in a range of 0 to 0.2 mm.

13. The optical lens according to claim 8, wherein the buffer portion of the sealing portion has a radius R, and wherein the radius R is in an appropriate range of 0.05 mm to 1 mm.

14. A method for manufacturing an optical lens, comprising the following steps:
confirming a position of a lens sheet relative to a main body of a lens barrel;
downwardly or laterally pressing an edge fastener of the lens barrel, wherein the edge fastener integrally extends from the main body and is bent twice by pressing process to overlap the lens sheet on the most object side, so that the lens sheet is smoothly wrapped and fixed to the lens barrel;
wherein the edge fastener forms a fastening portion and a sealing portion, wherein the sealing portion extends from the fastening portion and is attached to the upper surface of the lens sheet;
wherein the sealing portion comprises a buffer portion and an inclining portion, with an end portion of the sealing portion being formed at one end of the inclining portion, and the buffer portion of the sealing portion extends from the fastening portion to rest against the lens sheet in a bending manner, wherein the inclining portion of the sealing portion extends from the buffer portion to attach onto the lens sheet in an obliquely straight manner, and wherein the end portion of the sealing portion is a tail of the sealing portion extending to the lens sheet.

15. The method for manufacturing the optical lens according to claim 14, wherein the pressing process comprises:
downwardly or laterally pressing the edge fastener of the lens barrel to overlap the lens sheet with a relatively small inclination angle; and
downwardly pressing the edge fastener of the lens barrel to overlap the lens sheet with a relatively large inclination angle.

16. The method for manufacturing the optical lens according to claim 14, wherein the pressing process comprises:
downwardly or laterally pressing the edge fastener of the lens barrel to overlap the lens sheet with two different inclination angles.

17. A method for manufacturing an optical lens, comprising the following steps:
a. confirming a position of a lens sheet relative to a main body of a lens barrel;
b. laterally pressing a part of an edge fastener of the lens barrel to partially overlap the lens sheet with two different inclination angles; and
c. relatively rotating the lens barrel, so that the edge fastener wraps the lens sheet circumferentially, and the lens sheet is smoothly wrapped and fixed to the lens barrel;
wherein the edge fastener forms a fastening portion and a sealing portion, wherein the sealing portion extends from the fastening portion and is attached to the upper surface of the lens sheet;
wherein the sealing portion comprises a buffer portion and an inclining portion, with an end portion of the sealing portion being formed at one end of the inclining portion, and the buffer portion of the sealing portion extends from the fastening portion to rest against the lens sheet in a bending manner, wherein the inclining portion of the sealing portion extends from the buffer portion to attach onto the lens sheet in an obliquely straight manner, and wherein the end portion of the sealing portion is a tail of the sealing portion extending to the lens sheet.

18. The method for manufacturing the optical lens according to claim 17, wherein step b comprises the following steps:
b1. laterally pressing an edge fastener of the lens barrel to overlap the lens sheet with a relatively small inclination angle; and
b2. laterally pressing the edge fastener of the lens barrel further again to overlap the lens sheet with a relatively large inclination angle, wherein the edge fastener integrally extends from the main body and is bent twice to overlap the lens sheet on the most object side.

* * * * *